United States Patent [19]

McClain et al.

[11] 4,378,587
[45] Mar. 29, 1983

[54] FREQUENCY CONVERTER APPARATUS

[75] Inventors: James E. McClain; Howard L. Scott, both of Greenville, Tex.

[73] Assignee: ESCO Manufacturing Company, Greenville, Tex.

[21] Appl. No.: 202,757

[22] Filed: Oct. 31, 1980

[51] Int. Cl.³ ............................................. H02M 5/32
[52] U.S. Cl. ..................................... 363/174; 322/29; 322/95; 318/44; 318/419; 318/512
[58] Field of Search .................. 322/29, 32, 39, 95; 363/105, 174–176; 323/329, 332; 318/44, 357, 417, 419, 512, 513

[56] References Cited

U.S. PATENT DOCUMENTS

| 814,380 | 3/1906 | Lamme | 363/174 |
| 2,722,646 | 11/1955 | Rhyne, Jr. et al. | 318/513 X |
| 2,793,342 | 5/1957 | Rhyne, Jr. | 322/32 X |
| 2,797,375 | 6/1957 | Alexanderson | 318/513 X |
| 3,074,001 | 1/1963 | Roberti | 322/32 X |

Primary Examiner—William M. Shoop
Attorney, Agent, or Firm—Kenneth R. Glaser

[57] ABSTRACT

Disclosed is a frequency converter system for altering the frequency of a-c power supplied from a distribution network to a load, the system including a pair of mechanically coupled rotating alternating current machines, the alteration of the rate and direction of rotation of the prime mover altering the frequency of the power. A variable impedance network comprising saturable core reactors and connected in the rotor circuit of the prime mover is utilized to effect the change of rate and direction of prime mover rotation.

1 Claim, 1 Drawing Figure

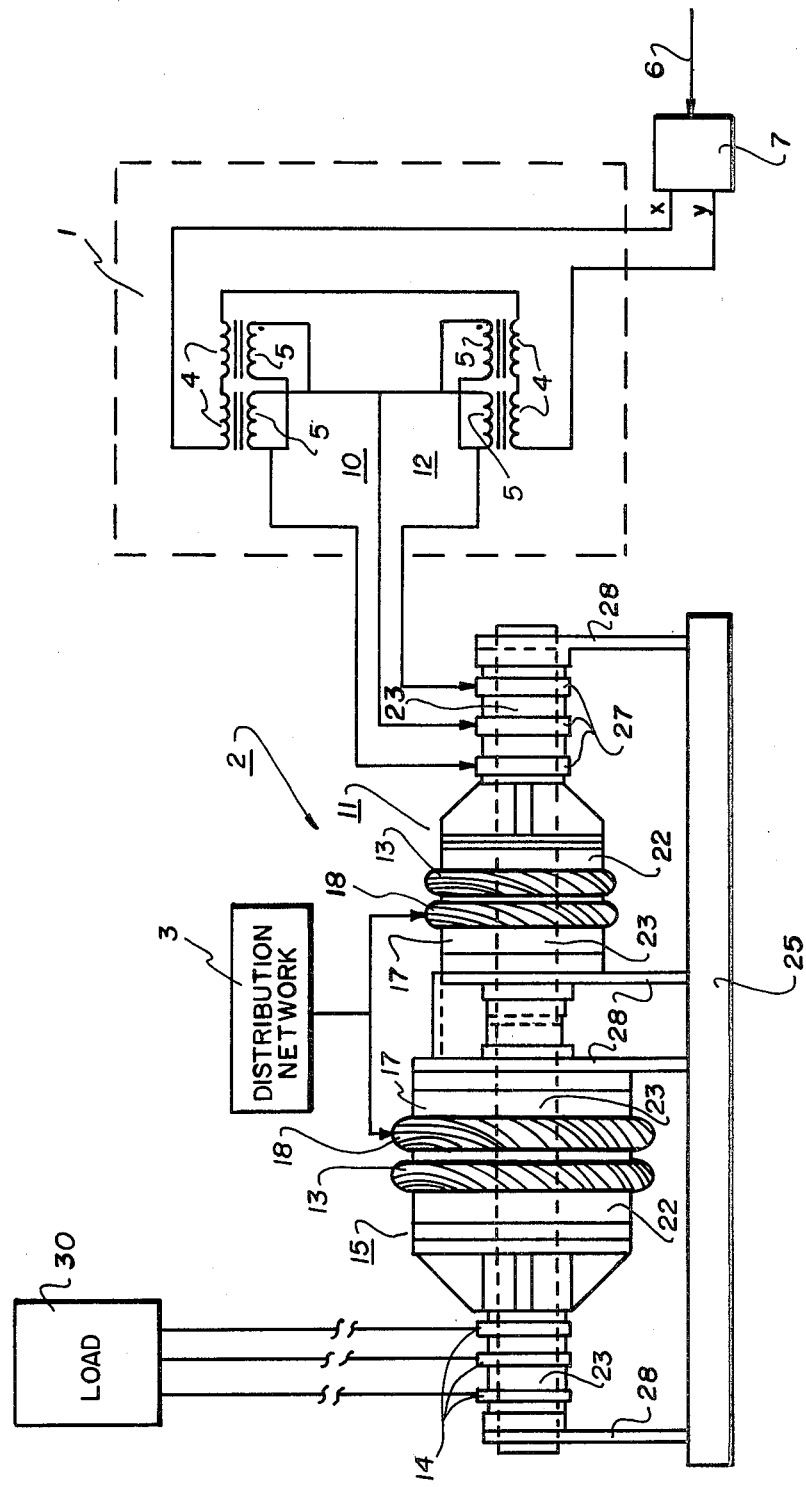

FREQUENCY CONVERTER APPARATUS

This invention relates to frequency converter apparatus, more particularly to electrical apparatus for altering the frequency of a-c power supplied to a load, and even more particularly to alternating current apparatus of the rotating coplanar type with an associated control for altering the impedence thereof to vary the frequency of the power supplied therefrom.

There are many applications where it is desirable to accurately vary the frequency of a-c power supplied to a load. For example, the production of crude oil from underground wells typically involves a pumping operation utilizing suspended, submersible motor-driven pumps located thousands of feet below the surface for pumping the petroleum to ground level. An example of such a system is described in a co-pending patent application entitled "Method and Apparatus for Monitoring and Controlling On-line Dynamic Operating Conditions", filed Oct. 20, 1980, and assigned to the assignee of the present invention.

During the course of the pumping operation, it is often desirable to increase or decrease the speed of the pump motor in order to vary the pumping rate to control the fluid level (fluid head) within the well. One way of altering the pump motor rpm is to vary the frequency of the power supplied to the motor.

It is therefore a principal object of the present invention to provide new and improved apparatus for altering the frequency of a-c power supplied to a load.

It is another object of the invention to provide new and improved frequency converter apparatus.

It is a still further object of the present invention to provide new and improved frequency converter apparatus of the rotating coplanar type.

These and other objects, as well as specific features and advantages, of the present invention will become more readily understood and appreciated from the following detailed description taken in conjunction with the accompanying drawing which is a schematic illustration of the preferred embodiment of the frequency control system of the invention depicting the frequency converter apparatus and associated control.

DESCRIPTION OF PREFERRED EMBODIMENT

Referring now to the drawing, there is now described a preferred embodiment of the frequency converter apparatus 2 of the present invention and the associated control module 1 for effecting the alteration of the frequency of the power supplied to a load 30 from a distribution network 3. The distribution network 3 is of a conventional type including distribution transformers for supplying power, normally three phase 60 Hz power, from a power source.

The frequency converter 2 includes a prime mover stage 11 mechanically coupled by way of rotatable shaft 23 to a converter stage 15, the entire assembly mounted by brackets 28 to a support 25. Each of the stages 11 and 15 essentially constitutes a rotating coplanar alternating current machine comprising a stator 17 (with stator windings 18) and a rotor 22 (with rotor windings 13). Both the rotor of the prime mover stage 11 and the rotor of the converter stage 15 are connected to, and adapted to simultaneously rotate with, the common shaft 23.

A first set of rotor slip rings 14 electrically connected in the rotor circuit of converter stage 15 in the manner conventionally known in the art is disposed at one end of the rotatable shaft 23 (as illustrated in the drawing). Thus, three phase power supplied from the output of the distribution network 3 to the prime mover and converter stages (for example, to the stator windings thereof) consequently results in power being supplied (by way of slip rings 14) to the load 30. Without the control feature now to be described, the frequency of the a-c power supplied to the load would be the frequency of the power supplied by the distribution network 3, normally 60 Hz.

In accordance with the unique feature of the present invention, however, the prime mover is driven in a manner which will alter (increase or decrease) the frequency of the power supplied to the motor from that supplied by the network 3. As an example of one way of effecting such result, a second set of rotor slip rings 27 electrically connected in the rotor circuit of the prime mover stage 11 is disposed at end of shaft 23 opposite that of the rings 14 and are electrically connected with the control module 1.

The control module 1 comprises a pair of saturable core reactors 10 and 12, each saturable core reactor comprising parallel connected a-c load windings 5 and a pair of series-connected d-c control windings 4. As depicted in the drawing, the outputs from the saturable core reactors 10 and 12 are connected across the slip rings 27, the reactors 10 and 12 thus, in effect, constituting a variable impedance network in the rotor circuit of the prime mover stage. It is believed apparent that by varying the magnitude and polarity of the d-c voltage across the d-c control windings 4, the a-c impedance of the saturable core reactors 10 and 12 (and thus of the rotor circuit of the prime mover stage) may be appropriately adjusted.

The d-c voltage across the control windings 4 is supplied at the output terminals X and Y of a circuit module 7, the module 7 normally including a conventional d-c power supply (the magnitude of which is regulated by a control signal 6 which could be supplied from a manually operated potentiometer or automatically from the output of a computer) and a conventional reversing switch for changing the polarity of the d-c signal across the output terminals X and Y.

The overall operation of the frequency converter 2 and associated control module 1 is now described. It is initially assumed that the frequency of the power supplied to the load is at the same frequency, 60 Hz, as that of the power supplied from the distribution network. By altering the signal 6 so as to change the magnitude of the d-c voltage across output terminals X and Y of the module 7 to decrease the effective a-c impedance of the saturable core reactors, the rate of rotation of the shaft 23 is increased, consequently increasing the frequency of the power supplied to the load 30 from the slip rings 14. Similarly, by altering the signal 5 to reverse the polarity of the d-c voltage at the terminals X and Y, the shaft 23 is consequently driven in the opposite direction, thus decreasing the frequency of the power supplied to the load.

Thus, it will be seen that the increased rate of rotation of the shaft 23 in its normal direction of rotation will cause an increase of the frequency of the power supplied to the load; while the rotation of the shaft in the opposite direction will essentially reduce the frequency of the power supplied to the load below that frequency of the power being supplied by the distribution network 3.

It is to be understood that the previous description is of just one preferred method for altering the rate, and direction, of rotation of the prime mover, other methods and means for accomplishing such objective which would be obvious to one skilled in the art falling within the scope of the present invention.

Various modifications to the disclosed embodiment, as well as alternate embodiments, may become apparent to one skilled in the art without departing from the spirit and scope of the invention as defined by the appended claims.

What is claimed is:

1. Apparatus for varying the frequency of a-c power supplied to a load comprising:
   a first rotating alternating current machine comprising a stator and rotor windings, the rotor windings being electrically connected with the load;
   a second rotating alternating current machine comprising stator and rotor windings connected with, and for rotatively driving, said first machine;
   a distribution network providing a source of a-c power of fixed frequency to the stator windings of both said first and second machines; and
   a control network for increasing the rate of rotation of said second machine in one direction, thereby to increase the frequency of the a-c power supplied to the load above said fixed frequency, and for rotating said second machine in the opposite direction, thereby to decrease the frequency of the a-c power supplied to the load below said fixed frequency, said control network comprising:
   at least one variable impedance saturable core reactor electrically interconnected with the rotor windings of said second machine, the a-c impedance of the reactor varying in response to both the magnitude and the polarity of a d-c voltage across the control winding of said at least one saturable core reactor, and
   means for varying both the magnitude and the polarity of the d-c voltage across said control winding.

* * * * *